(12) United States Patent
Kataoka et al.

(10) Patent No.: US 6,526,115 B2
(45) Date of Patent: Feb. 25, 2003

(54) SUPERCRITICAL-PRESSURE WATER COOLED REACTOR AND POWER GENERATION PLANT

(75) Inventors: Kazuyoshi Kataoka, Kanagawa-ken (JP); Masahiro Ookawa, Kanagawa-ken (JP); Eiko Fueki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/903,854

(22) Filed: Jul. 13, 2001

(65) Prior Publication Data

US 2003/0012328 A1 Jan. 16, 2003

(30) Foreign Application Priority Data

Jul. 14, 2000 (JP) .................................. 2000-214539

(51) Int. Cl.[7] .............................................. G21C 15/00
(52) U.S. Cl. ...................................... 376/370; 376/221
(58) Field of Search ............................... 346/370, 221

(56) References Cited

U.S. PATENT DOCUMENTS

| | | | | |
|---|---|---|---|---|
| 3,150,052 A | * | 9/1964 | Stoker et al. | 376/286 |
| 3,284,310 A | * | 11/1966 | Straat | 376/310 |
| 3,346,461 A | * | 10/1967 | Notari et al. | 376/285 |
| 3,357,891 A | * | 12/1967 | Wadmark | 376/253 |
| 3,384,551 A | * | 5/1968 | Kornbichler | 376/370 |
| 3,386,887 A | * | 6/1968 | Mogard | 376/370 |
| 3,414,473 A | * | 12/1968 | Schluderberg et al. | 376/210 |
| 3,660,231 A | * | 5/1972 | Fox et al. | 376/203 |
| 3,802,992 A | * | 4/1974 | Griffith et al. | 376/221 |
| 4,300,481 A | * | 11/1981 | Fisk | 122/406 |
| 4,357,908 A | * | 11/1982 | Yazidjian | 122/32 |
| 5,317,613 A | * | 5/1994 | Fennern | 376/439 |
| 5,361,377 A | * | 11/1994 | Miller | 376/211 |
| 5,526,386 A | * | 6/1996 | Tsiklauri et al. | 376/317 |

FOREIGN PATENT DOCUMENTS

| | | | |
|---|---|---|---|
| JP | 05-333184 | * 12/1993 | 376/282 |
| JP | 8-313664 | 11/1996 | |
| JP | 2001-4774 | 1/2001 | |

OTHER PUBLICATIONS

Kazuyoshi Kataoka et al., "Neutronic Feasibility of Supercritical Steam Cooled Fast Breeder Reactor", Journal of Nuclear Science and Technology, vol. 28, No. 6, Jun. 1991, pp. 585–587.

* cited by examiner

Primary Examiner—Michael J. Carone
Assistant Examiner—Daniel Matz
(74) Attorney, Agent, or Firm—Foley & Lardner (57) ABSTRACT

A supercritical pressure water cooled reactor comprising: a reactor vessel including: a shell part for containing sub-critical pressure coolant, and an end part for containing supercritical-pressure coolant which is separated from the sub-critical pressure coolant in the reactor vessel. A core-support plate with through-holes, the core-support plate disposed-in and fixed to the reactor vessel so that the core-support plate divides space inside the reactor vessel into a supercritical-pressure portion and a sub-critical pressure portion. Fuel tubes with both open ends fixed to the through-holes, the open ends being communicated to the supercritical-pressure portion, outside of the fuel tubes being disposed in the sub-critical pressure portion; and nuclear fuel assemblies disposed in the fuel tubes.

10 Claims, 7 Drawing Sheets

SUPERCRITICAL-PRESSURE WATER COOLED REACTOR AND POWER GENERATION PLANT

BACKGROUND OF THE INVENTION

This invention is related to supercritical water cooled nuclear reactors and electric power generation plants utilizing such nuclear reactors.

In the prior art, pressurized water nuclear reactors (PWRs) and boiling water nuclear reactors (BWRs) are well known and commercially operated. A typical PWR power plant comprises steam generators outside of the reactor, which are a kind of heat exchangers where heat is transferred from the primary coolant which has been heated in the PWR. The secondary coolant is changed into steam in the steam generators. The steam is used to rotate steam turbines and then generate electricity. Typical pressure in a PWR reactor vessel is about 15 MPa and the primary coolant temperature at the outlet of the PWR is about 320° C. Typical pressure of the secondary coolant at the outlets of the steam generators is about 7 MPa, and the efficiency of the typical PWR electric power generation is about 35 percent.

On the other hand, a typical BWR power plant does not have an external steam generator. Steam for steam turbines is generated in the BWR itself, and the steam at the outlet of the BWR has a pressure of about 7 MPa and a temperature of about 290° C. Thus, the efficiency of the typical BWR electric power generation is about 35 percent.

Figure 1:
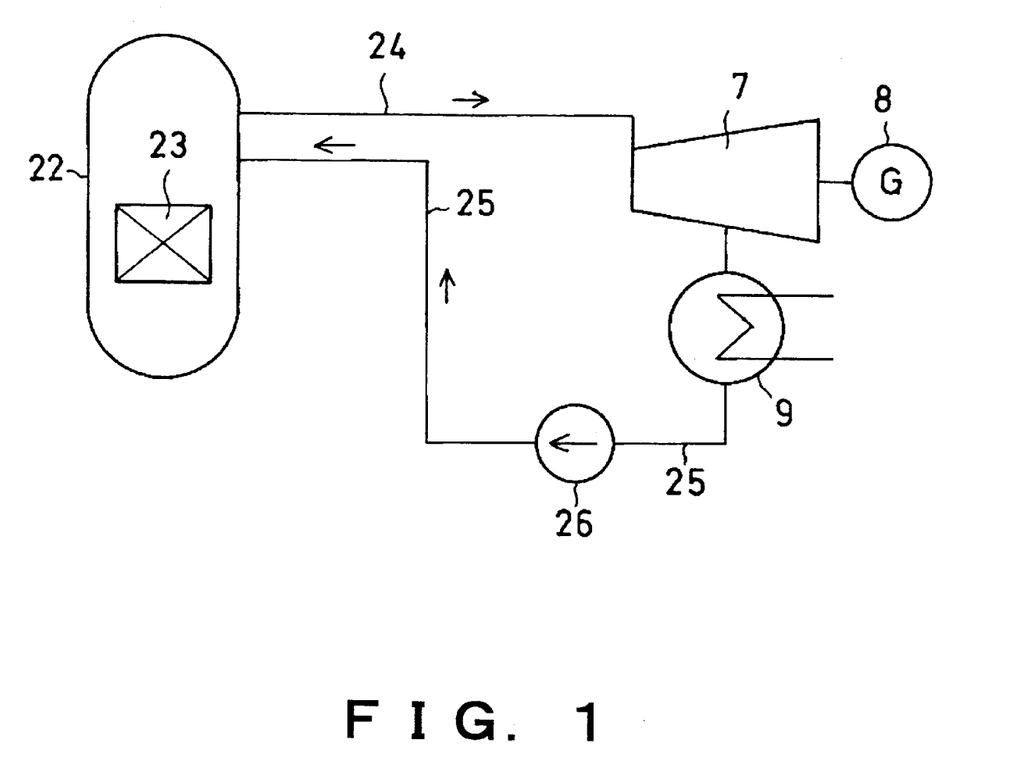
FIG. 1 is a flow diagram of an electric power generation plant including a supercritical water cooled reactor of the prior art.

Supercritical-pressure water nuclear reactors have been proposed as shown in FIG. 1 which is similar to those disclosed in Japanese Patent Application Publication (Tokkai-Hei) 8-313664, the disclosure of which is hereby incorporated by reference in its entirety.

Referring to FIG. 1, a nuclear reactor vessel 22 contains a core 23 where nuclear reaction occurs. The core 23 heats up supercritical-pressure water into a supercritical-fluid having a pressure of about 25 MPa and a temperature of about 450° C. Water having a pressure and a temperature above the critical point values that are 22.1 MPa and 374° C., respectively, is not liquid nor steam, but behaves like steam. Therefore, that kind of fluid may be called "steam" or "supercritical-pressure steam" hereinbelow.

The supercritical-pressure steam is sent to a steam turbine 7 via a main steam line 24. The steam turbine 7 is rotated by the steam and drives an electric power generator 8. The steam is then condensed into water in a condenser 9. The condensed water is then pumped up to supercritical pressure by a feed water pump 26 and sent back to the nuclear reactor vessel 22 via a feed water line 25.

The efficiency of the supercritical water cooled reactor electric power generation is about 40 percent which is higher than that of PWRs and BWRs due to the improved steam condition supplied to the steam turbine. However, the steam condition of the supercritical water cooled reactor is still lower than that of supercritical-pressure thermal power plants.

Furthermore, the reactor vessel of the supercritical water cooled reactor should have thicker walls due to the higher pressure compared to PWRs and BWRs. The wall thickness for a supercritical water cooled reactor may be 1.7 times of that for a PWR with a same diameter of the reactor vessel.

SUMMARY OF THE INVENTION

Accordingly, it is an object of the present invention to provide an improved supercritical water cooled reactor and an improved electric power generation plant utilizing such a nuclear reactor, which are more efficient and economical.

There has been provided, in accordance with an aspect of the present invention, a supercritical water cooled reactor comprising: a reactor vessel including: a shell part for containing sub-critical pressure coolant, and an end part for containing supercritical-pressure coolant which is separated from the sub-critical pressure coolant in the reactor vessel; a core-support plate with a plurality of through-holes, the core-support plate disposed in and fixed to the reactor vessel so that the core-support plate divides space inside the reactor vessel into a supercritical-pressure portion and a sub-critical pressure portion; a plurality of fuel tubes with both open ends fixed to the through-holes, the open ends being communicated to the supercritical-pressure portion, outside of the fuel tubes being disposed in the sub-critical pressure portion; a plurality of nuclear fuel assemblies disposed in the fuel tubes; means for introducing supercritical-pressure water into the supercritical-pressure portion; means for extracting supercritical-pressure steam generated in the fuel tubes out of the supercritical-pressure portion; means for introducing sub-critical pressure coolant into the sub-critical pressure portion; means for extracting sub-critical pressure coolant out of the sub-critical pressure portion; a plurality of control rods which are arranged so that the control rods can be inserted into the sub-critical pressure portion adjacent to the fuel tubes through the shell part; and a control rod drive for driving the control rods from outside of the reactor vessel.

There has also been provided, in accordance with another aspect of the present invention, an electric power generation plant having: (a) a supercritical water cooled reactor comprising: a reactor vessel including: a shell part for containing sub-critical pressure coolant, and an end part for containing supercritical-pressure coolant which is separated from the sub-critical pressure coolant in the reactor vessel; a core-support plate with a plurality of through-holes, the core-support plate disposed in and fixed to the reactor vessel so that the core-support plate divides space inside the reactor vessel into a supercritical-pressure portion and a sub-critical pressure portion; a plurality of fuel tubes with both open ends fixed to the through-holes, the open ends being communicated to the supercritical-pressure portion, outside of the fuel tubes being disposed in the sub-critical pressure portion; a plurality of nuclear fuel assemblies disposed in the fuel tubes; means for introducing supercritical-pressure water into the supercritical-pressure portion; means for extracting supercritical-pressure steam generated in the fuel tubes out of the supercritical-pressure portion; means for introducing sub-critical pressure coolant into the sub-critical pressure portion; means for extracting sub-critical pressure coolant out of the sub-critical pressure portion; a plurality of control rods which are arranged so that the control rods can be inserted into the sub-critical pressure portion adjacent to the fuel tubes through the shell part; and a control rod drive for driving the control rods from outside of the reactor vessel; (b) a higher pressure turbine receiving the supercritical-pressure steam extracted from the supercritical-pressure portion of the reactor; (c) means for extracting part of output steam of the higher pressure turbine to introduce the output steam to the sub-critical pressure portion of the reactor; (d) a lower pressure turbine receiving the sub-critical pressure coolant extracted from the sub-critical pressure portion of the reactor; and (e) an electric generator driven by at least on of the higher and lower pressure turbines.

BRIEF DESCRIPTION OF THE DRAWINGS

The above and other features and advantages of the resent invention will become apparent from the discussion hereinbelow of specific, illustrative embodiments thereof presented in conjunction with the accompanying drawings, in which.

DETAILED DESCRIPTION OF EMBODIMENTS OF THE INVENTION

In the following description, like reference characters represent like elements, and repetitive description may be omitted.

Figure 2A:
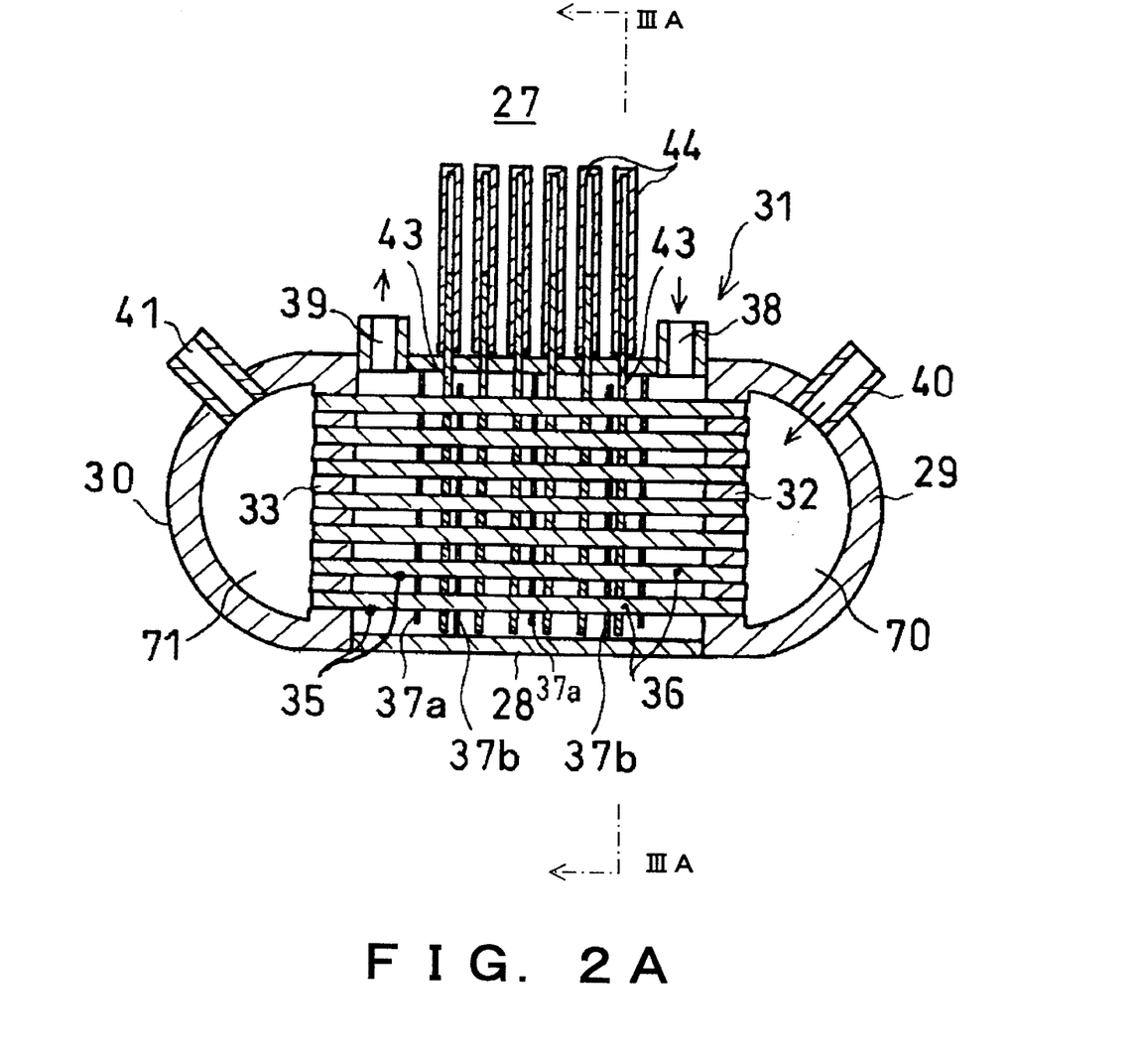
FIG. 2A is a vertical longitudinal sectional view of a first embodiment of a supercritical water cooled reactor according to the present invention.

A first embodiment of a supercritical water cooled reactor according to the present invention is now described with reference to FIGS. 2A–3B. As shown in FIG. 2A, the supercritical water cooled reactor 27 comprises a reactor vessel 31, which has a shell part 28 with a horizontal axis, an inlet header 29 and an outlet header 30. The inlet and outlet headers 29 and 30, respectively, are in semi-spherical shapes and are coupled to opposite ends of the shell part 28. In the inlet and outlet headers 29 and 30, core support plates 32 and 33 are disposed to form inlet and outlet portions 70 and 71, respectively, within the reactor vessel 31.

Figure 2B:
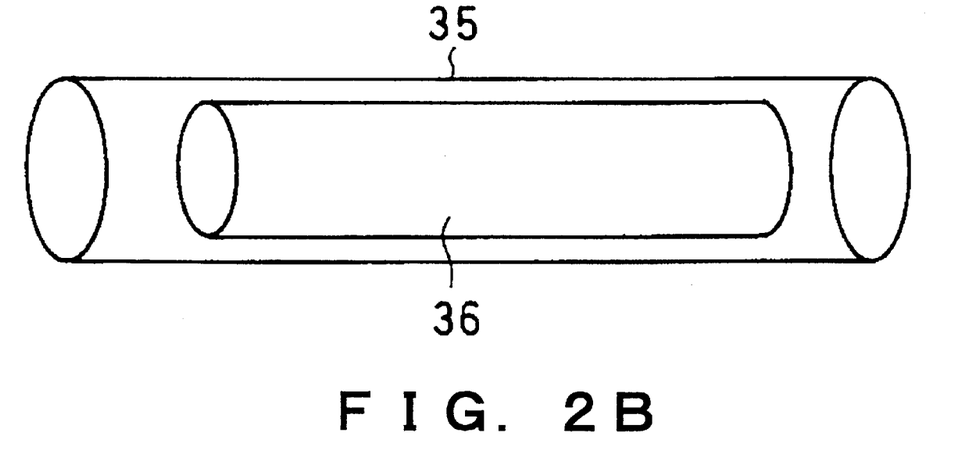
FIG. 2B is a partial enlarged schematic perspective view of one of the fuel tubes shown in FIG. 2A.
Figure 2C:
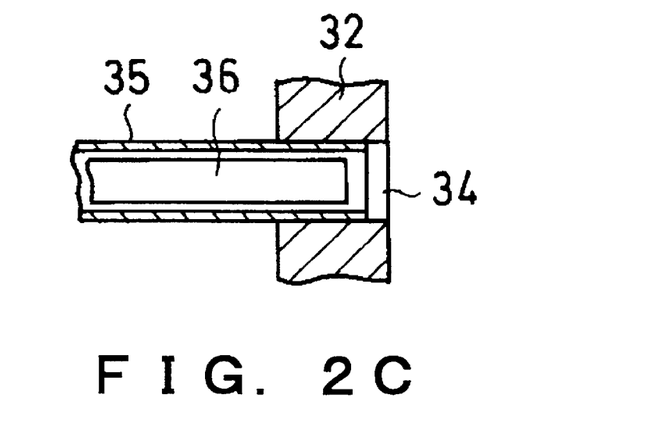
FIG. 2C is an enlarged view of an end of one of the fuel tubes and its vicinity shown in FIG. 2A.

The core support plates 32 and 33 have many through-holes 34, and each through-hole 34 has a fuel tube 35 with an open end in it as shown in FIG. 2C. The fuel tubes 35 are horizontally elongated between the two core support plates 32 and 33, and fixed and sealed to the through-holes 34 of the core support plates 32 and 33, by welding, for example. A nuclear fuel assembly 36 comprising a bundle of fuel rods (not shown) is disposed within each of the fuel tubes 35 as shown in FIGS. 2B and 2C. Alternatively, a plurality of fuel assemblies may be longitudinally disposed in each fuel tube 35.

The inlet and outlet headers 29 and 30 have a feed water inlet nozzle 40 and a main steam outlet nozzle 41, respectively. Supercritical-pressure water is introduced into the inlet portion 70 through the feed water inlet nozzle 40, and then, into the fuel tubes 35 via the through-holes 34 of the core support plate 32.

The supercritical-pressure water is heated up into supercritical-pressure steam there by the nuclear reaction of the nuclear fuel assemblies 36 in the fuel tubes 35. The supercritical-pressure steam flows out of the fuel tubes 35 via the through-holes 34 of the core support plate 33 into the outlet portion 71, then flows out of the reactor vessel 28 through the main steam outlet nozzle 41.

The temperature of the supercritical-pressure water in the inlet portion 70 is below the pseudo-critical point, while the temperature of the supercritical-pressure steam in the outlet portion 71 is above the pseudo-critical point.

The shell part 28 of the reactor vessel 31 has coolant inlet and outlet nozzles 38 and 39, respectively, in the vicinity of opposite ends. Subcritical-pressure coolant is introduced into the shell part 28 outside of the fuel tubes 35 from the inlet nozzle 38. The sub-critical-pressure coolant may be in steam phase or in two-phase state of liquid and steam. The sub-critical-pressure coolant is heated up by the fuel tubes 35, and flows out of the reactor vessel 31 via the outlet nozzle 39.

A plurality of upper baffle plates 37a and lower baffle plates 37b are alternately arranged perpendicular to the fuel tubes 35 with substantially equal spaces between them in the shell part 28 outside of the fuel tubes 35. The upper baffle plates 37a are arranged with their upper edges contact to the inner surface of the shell part 28 and with their lower edges spaced from the inner surface of the shell part 28, while the lower baffle plates 37b are arranged with their lower edges contact to the inner surface of the shell part 28 and with their upper edges spaced from the inner surface of the shell part 28. The sub-critical-pressure coolant in the shell part 28 flows in zigzag due to the baffle plates 37a and 37b, enhancing heat transfer outside of the fuel tubes 35.

Figure 3A:
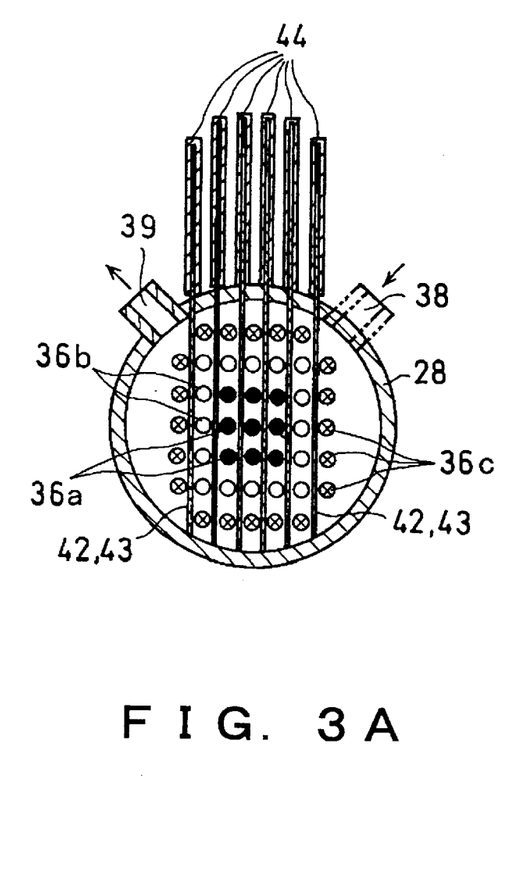
FIG. 3A is a cross-sectional view taken along Line IIIA—IIIA in FIG. 2A.
Figure 3B:
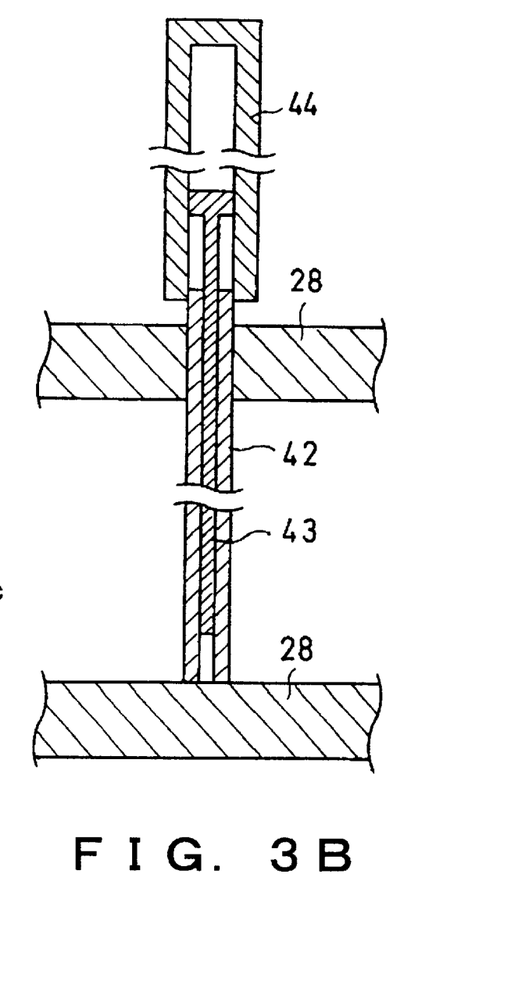
FIG. 3B is an enlarged cross-sectional view of one of the control rods and its vicinity shown in FIG. 2A.

As shown in FIGS. 2A, 3A and 3B, a plurality of control rods 43 vertically penetrate the shell part 28 and are driven by a control rod drive 44 which are disposed above the control rods 43, for controlling the nuclear reaction. The control rods 43 are arranged in control rod guide tubes 42 which penetrate the shell part 28, as shown in FIG. 3B. The control rods 43 and the control rod guide tubes 42 are arranged between the fuel assemblies each of which is disposed in one of the fuel tubes 35 as shown in FIG. 2B).

The fuel assemblies 36 includes nine core fuel assemblies 36a shown as solid circles in FIG. 3A, sixteen blanket fuel assemblies 36b shown as hollow circles in FIG. 3A immediately surrounding the core fuel assemblies 36a, and twenty reflector fuel assemblies 36c shown as circles with "x"s in FIG. 3A surrounding the blanket fuel assemblies 36b. The number of fuel assemblies of each type can be changed depending on the design condition.

In this embodiment of the supercritical water cooled reactor according to the present invention, the inlet and outlet headers 29 and 30, respectively, and the inside of the fuel tubes 35 are exposed to the supercritical pressure, while the shell part and the control rod guide tubes are exposed to the sub-critical pressure. Thus, the mechanical requirements for designs of the walls of the shell part 28 and the control rod guide tubes 42 are less severe compared to those of the corresponding parts of the supercritical water cooled reactor in the prior art. Therefore, cost of manufacturing the supercritical water cooled reactor 27 can be reduced.

In addition, in this embodiment of the supercritical water cooled reactor 27 according to the present invention, the reactor vessel 31 is arranged with its horizontal longitudinal axis, so that the gravity center is lowered and resistance to earthquakes are enhanced. Furthermore, the control rods 43 can be inserted more easily into the core in assistance of the gravitational force.

Figure 4:
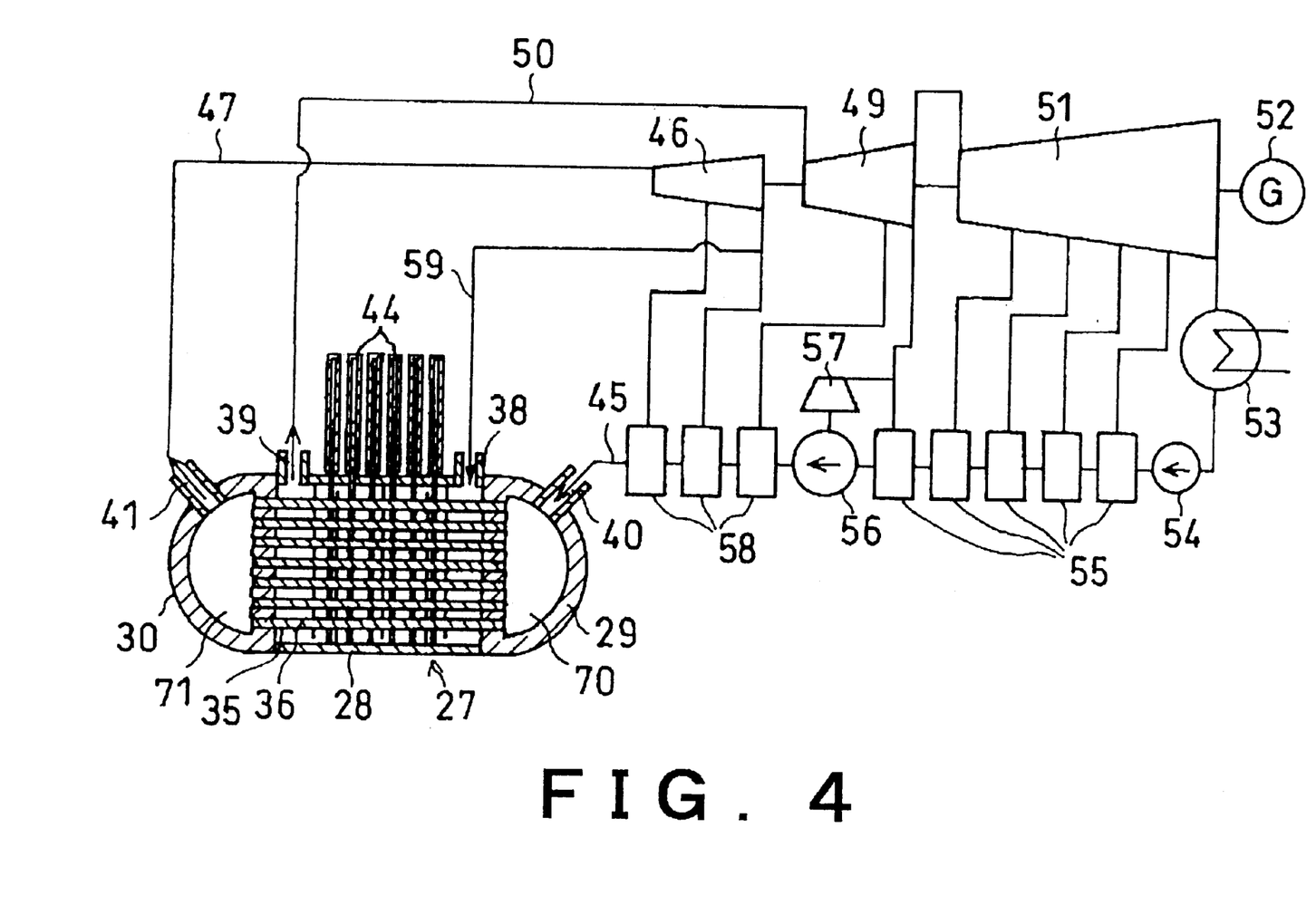
FIG. 4 is a flow diagram of an embodiment of an electric power generation plant including the supercritical water cooled reactor shown in FIGS. 2A–3B.

FIG. 4 shows an embodiment of an electric power generation plant utilizing the supercritical water cooled reactor 27 shown in FIGS. 2A–3B. The main steam outlet nozzle 41 is connected to a main steam line 47 which is connected to an inlet of a high pressure steam turbine.

The outlet of the high pressure steam turbine 46 is connected to a return-re-heater line 59 which is connected to the coolant inlet nozzle 38. Part of the steam in the high pressure steam turbine 46 is extracted at the outlet or at an intermediate stage to high pressure feed water heaters 58 to heat up feed water as described in detail later.

The coolant outlet nozzle 39 is connected to a re-heated steam line 50 which is connected to an inlet of an intermediate pressure turbine 49.

The outlet of the intermediate pressure steam turbine 49 is connected to an inlet of a low pressure steam turbine 51. Part of the steam in the intermediate pressure turbine 49 is extracted at an outlet or at an intermediate stage to low pressure feed water heaters 55 or to the high pressure feed water heaters 58 where the feed water is heated.

The outlet of the low pressure steam turbine 51 is connected to a condenser 53. The water condensed in the condenser 53 is pumped up by a condensed water pump 54, and is heated up in the low pressure feed water heaters 55 which are heated by part of the steam extracted from the lower pressure steam turbine 51 and the steam extracted from the intermediate pressure steam turbine 49.

The condensed water is then pumped up to a supercritical pressure by a feed water pump 56 which is driven by a feed water pump driving turbine 57 which is rotated by the steam fed by the intermediate pressure turbine 49. The water pumped up by the feed water pump 56 which is called "feed water" is further heated up by the high pressure feed water heaters 58, and then returned to the reactor vessel 27 through a feed water line 45 and the feed water inlet nozzle 40.

The rotor shafts of the high pressure, intermediate pressure and low pressure turbines 46, 49 and 51, respectively, are connected together and to an electric power generator 52. Thus, the electric power generator 52 is driven by the steam turbines 46, 49 and 51.

In the embodiment shown in FIG. 4, the exhausted steam from the high pressure turbine 46 is re-heated into superheated steam in the shell part 28 of the reactor vessel 27 and is fed to the intermediate pressure turbine to form a "reheated cycle", which enhances thermal efficiency of the turbine system. In addition, wetness of the steam in the turbines is lowered and turbine blade erosion is minimized. Furthermore, the compact turbine system can be designed due to the high steam temperature or high specific energy.

In the embodiment shown in FIG. 4, five low pressure feed water heaters 55 and three high pressure feed water heaters 58 are arranged in series along the feed water line 45, but the number of the feed water heaters can be changed depending on the plant specification.

A second embodiment of a supercritical water cooled reactor according to the present invention is now described with reference to FIGS. 5A and 5B. This embodiment is similar to the first embodiment shown in FIGS. 2A–3B except that adapters 60 are inserted between the fuel tubes 35 and the through-holes 34 of the core support plates 32 and 33.

The adapters 60 are shell tubes, and is inserted and welded, or threaded, in the through-holes 34. The adapters 60 have tapered sections 72 with enlarged ends at the inlet or outlet portions 70 or 71, respectively. The fuel tubes 35 are inserted into the adapters 60. The adapters 60 are made of proper material which is softer and has a larger thermal expansion factor than the fuel tubes 35.

Figure 5A:
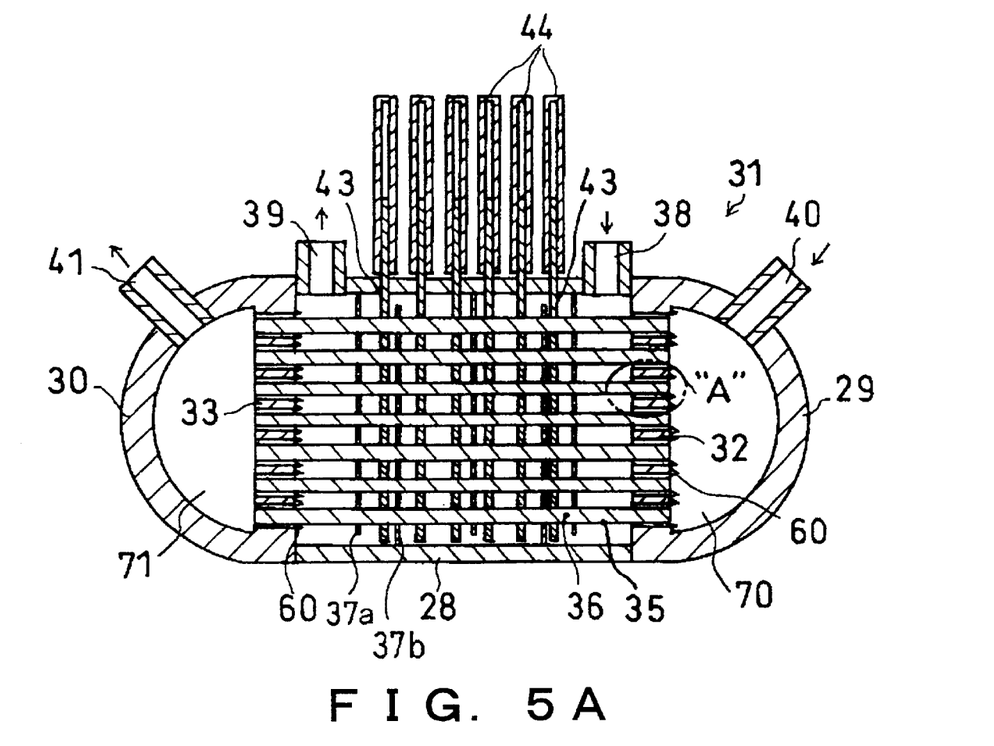
FIG. 5A is a vertical longitudinal cross-sectional view of a second embodiment of a supercritical water cooled reactor according to the present invention.
Figure 5B:
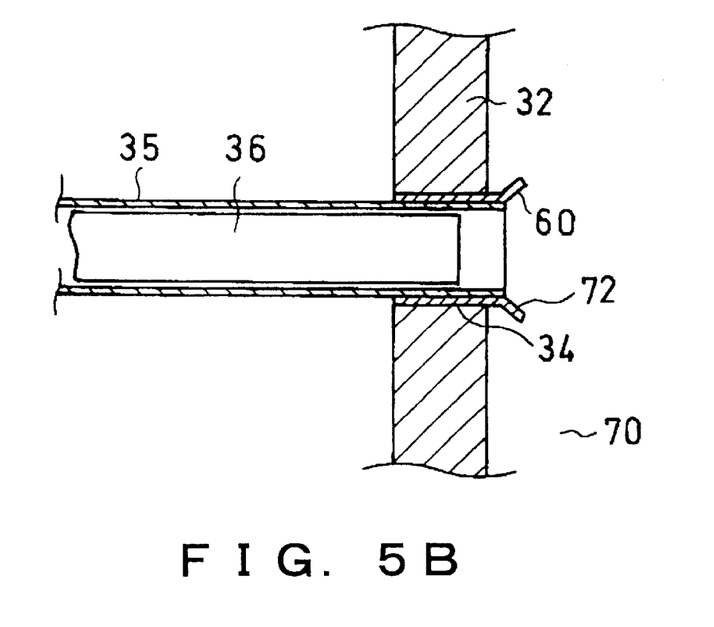
FIG. 5B is an enlarged view of a part "A" shown in FIG. 5A.

In the embodiment shown in FIGS. 5A and 5B, it is easy to insert the fuel tubes 35 into the adapters 60 due to the enlarged tapered sections 72. In addition, it is easy to remove all or some of the fuel tubes 35 out of the adapters 60 and replace them with new ones, when the fuel tubes 35 have been damaged. It is easy to replace the fuel assemblies 36 because they can be replaced with the fuel tubes 35 containing them.

A third embodiment of a supercritical water cooled reactor according to the present invention is now described with reference to FIG. 6. This embodiment is similar to the second embodiment shown in FIGS. 5A and 5B except for the features described below:

The reactor vessel 80 has an inlet-outlet header 61 and an intermediate header 65 instead of an inlet header 29 and an outlet header 30 (FIG. 5A).

The space surrounded by the inlet-outlet header 61 and the core support plate 32 is divided into inlet and outlet chambers 63 and 64, respectively, by a dividing plate 62. The feed water inlet nozzle 40 and the main steam outlet nozzle 41 are connected to the inlet and outlet chambers 63 and 64, respectively.

An end of each of the plurality of the fuel tubes 35a and 35b is fixed to the core support plate 33 at the intermediate header 65 and is connected to an intermediate portion 81 which is the semi-spherical space formed by the intermediate header 65. On the other hand, at the other ends of the fuel tubes 35a and 35b fixed to the core support plate 33 at the inlet-outlet header 61, upper half of the fuel tubes 35a are connected to the inlet chamber 63 and lower half of the fuel tubes 35b are connected to the outlet chamber 64.

In operation, supercritical-pressure water is introduced into the inlet chamber 63 through the feed water inlet nozzle 40, and then, into the upper half of the fuel tubes 35a via the through-holes of the upper part of the core support plate 32. The supercritical-pressure water is heated in the fuel tubes 35a and flows into the intermediate portion 81 via the through-holes of the upper part of the core support plate 33. The supercritical-pressure water(fluid) in the intermediate portion 81 then turns around and flows into the lower half of the fuel tubes 35b. The supercritical-pressure water(fluid) is heated further in the fuel tubes 35b, and flows into the outlet chamber 64, then flows out of the reactor vessel 80 through the main steam outlet nozzle 41.

According to this embodiment, the effective length of the fuel tubes 35a and 35b are doubled for a same length of the shell part 28, or a design with a shortened shell part 28 may be possible.

A fourth embodiment of a supercritical water cooled reactor according to the present invention is now described with reference to FIG. 7. This embodiment is similar to the third embodiment shown in FIG. 6 except for the features described below:

Each pair of the straight fuel tubes 35a and 35b which are connected to the inlet and outlet chambers 63 and 64, respectively, are mutually connected with a semicircular curved tube 66 to form a U-shaped fuel tube. Alternatively, U-shaped fuel tubes can be manufactured by bending long straight tubes.

The intermediate header 91 does not have a core support plate and is exposed to the coolant under sub-critical pressure instead of the supercritical-pressure fluid. Therefore, the coolant outlet nozzle 39 may be located at the intermediate header 91 as shown in FIG. 7. The fuel assemblies and control rods are located in the shell part 28, or in and around the straight fuel tubes 35a and 35b.

In operation, supercritical-pressure water is introduced into the inlet chamber 63 through the feed water inlet nozzle 40, and then, into the fuel tubes 35a. Then, the supercritical-pressure water flows through the straight fuel tubes 35a, the semi-circular curved tubes 66 and the straight fuel tubes 35b. The supercritical-pressure water is heated in the straight portions of the fuel tubes 35a and 35b. Then, the supercritical-pressure water (fluid) flows into the outlet chamber 64, then flows out of the reactor vessel 90 through the main steam outlet nozzle 41.

Figure 6:
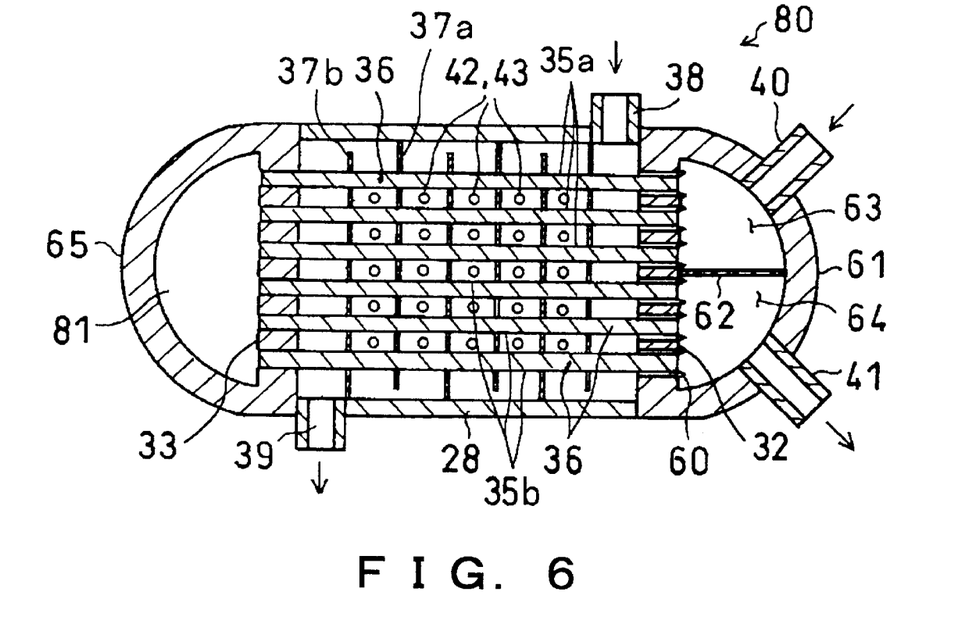
FIG. 6 is a vertical longitudinal sectional view of a third embodiment of a supercritical water cooled reactor according to the present invention.
Figure 7:
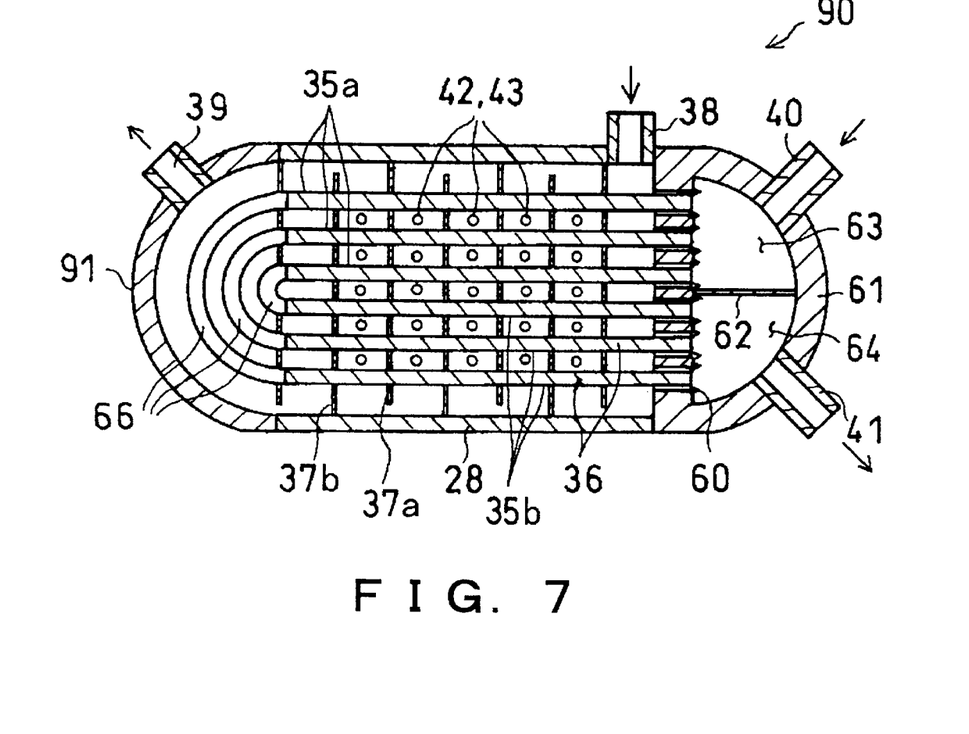
FIG. 7 is a vertical longitudinal sectional view of a fourth embodiment of a supercritical water cooled reactor according to the present invention.

According to this embodiment, the effective length of the fuel tubes 35a and 35b are doubled for the same length of the shell part 28, or a design with a shortened shell part 28 may be possible as the embodiment of FIG. 6. Furthermore, according to this embodiment, the semi-circular curved tubes 66 can absorb thermal expansion of the fuel tubes 35a, 66 and 35b, so that mechanical design becomes easy. Furthermore, since the intermediate header 91 is exposed to the coolant under sub-critical pressure instead of the supercritical-pressure fluid, the wall thickness of the intermediate header 91 can be reduced compared to that of the intermediate header 65 shown in FIG. 6.

Numerous modifications and variations of the present invention are possible in light of the above teachings. It is, therefore, to be understood that, within the scope of the appended claims, the present invention can be practiced in a manner other than as specifically described herein. For example, the reactor vessel can be in any orientations including up-right orientation where the fuel tubes are substantially vertical.

What is claimed is:

1. A supercritical-pressure water cooled reactor comprising:
   a reactor vessel including: first and second end parts dimensioned to contain supercritical-pressure coolant and a shell part disposed between the first and the second end parts dimensioned to contain sub-critical-pressure coolant;
   first and second core-support plates each having a plurality of through-holes, the first and the second core-support plates being disposed in and fixed to the reactor vessel so that the core-support plates divide space inside the reactor vessel into first and second supercritical-pressure portions in the first and the second end parts, respectively, and a sub-critical pressure portion in the shell part;
   a plurality of fuel tubes each having an interior volume, an outer surface and first and second open ends fixed to one of the through-holes in the first core-support plate and one of the through-holes in the second core-support plate, respectively, so that the interior volumes of the fuel tubes are in fluidic communication with the supercritical-pressure portions, the outer surfaces of the fuel tubes can be exposed to the sub-critical pressure coolant, and the supercritical-pressure coolant and the sub-critical pressure coolant cannot be mixed together in the reactor vessel;
   a plurality of nuclear fuel assemblies disposed in the fuel tubes;
   a supercritical-pressure water inlet disposed in the reactor vessel for introducing supercritical-pressure water into one of the supercritical-pressure portions;
   a supercritical-pressure steam outlet disposed in the reactor vessel for extracting supercritical-pressure steam generated in the fuel tubes out of one of the supercritical-pressure portions;
   a sub-critical pressure coolant inlet disposed in the reactor vessel for introducing sub-critical pressure coolant into the sub-critical pressure portion;
   a sub-critical pressure coolant outlet disposed in the reactor vessel for extracting sub-critical pressure coolant out of the sub-critical pressure portion;
   a plurality of control rods which are arranged so that the control rods can be inserted into the sub-critical pressure portion adjacent to the fuel tubes through the shell part; and
   a control rod drive for driving the control rods from outside of the reactor vessel.

2. A supercritical-pressure water cooled reactor according to claim 1, wherein the supercritical-pressure water inlet and the supercritical-pressure steam outlet are disposed in the first and the second end parts, respectively.

3. A supercritical-pressure water cooled reactor according to claim 1, wherein:
   the reactor vessel is arranged so that an axis of the shell part lies horizontally; and
   the control rods are arranged substantially vertically.

4. A supercritical-pressure water cooled reactor according to claim 1, wherein:
   the open ends of the fuel tubes penetrate and are fixed to the through-holes with adapters inserted between the fuel tubes and the through-holes.

5. A supercritical-pressure water cooled reactor according to claim 1, further comprising:
   a dividing plate for dividing the first supercritical-pressure portion into inlet and outlet chambers;
   wherein the first core-support plate has inlet and outlet portions facing the inlet and the outlet chambers, respectively, wherein some of the through-holes are disposed in the inlet portion and the rest of the through-holes are disposed in the outlet portion; and
   wherein the supercritical-pressure water inlet and the supercritical-pressure steam outlet are disposed in the inlet and the outlet chambers, respectively.

6. A supercritical-pressure water cooled reactor comprising:
   a reactor vessel including a shell part having two ends with an inlet header on one end and an outlet header on the other end;
   first and second core-support plates each having a plurality of through-holes, the first core-support plate being fixed to the inlet header, the second core-support plate being fixed to the outlet header, so that an inlet header portion for containing supercritical-pressure coolant, an outlet header portion for containing supercritical-pressure coolant and a shell portion between them for containing sub-critical-pressure coolant are formed in the reactor vessel;
   a plurality of fuel tubes each having an outer surface and first and second open ends fixed to one of the through-holes of the first and the second core-support plates, respectively, for forming sealed passages of the supercritical-pressure coolant from the inlet header portion to the outlet header portion via the fuel tubes so that the supercritical-pressure coolant and the sub-critical pressure coolant cannot be mixed together in the reactor vessel, wherein the outer surfaces of the fuel tubes are exposed to the sub-critical pressure coolant;

a plurality of nuclear fuel assemblies disposed in the fuel tubes;

a feed water inlet disposed in the reactor vessel for introducing supercritical-pressure water into the inlet header portion;

a main steam outlet disposed in the reactor vessel for extracting supercritical-pressure steam out of the outlet header portion;

a coolant inlet disposed in the reactor vessel for introducing sub-critical pressure coolant into the shell portion outside of the fuel tubes;

a coolant outlet disposed in the reactor vessel for extracting sub-critical pressure coolant out of the shell portion outside of the fuel tubes;

a plurality of control rod guide tubes inserted into the shell portion outside of the fuel tubes;

a plurality of control rods which are arranged so that the control rods can be inserted into the control rod guide tubes; and a control rod drive for driving the control rods from outside of the reactor vessel.

7. A supercritical-pressure water cooled reactor comprising:

a reactor vessel having a first end and a second end and including a shell part with an inlet-outlet header on the first end and an intermediate header on the second end;

first and second core-support plates each having a plurality of through-holes, the first and the second core-support plates being fixed to the inlet-outlet header and the intermediate header, respectively, so that an inlet-outlet header portion, an intermediate header portion and a shell portion between them are formed in the reactor vessel;

a dividing plate for dividing the inlet-outlet header portion into inlet and outlet chambers, so that the first core-support plate is divided into inlet and outlet portions each having a plurality of the through-holes;

a first group of fuel tubes, each having first and second open ends, the first open end being fixed to one of the through-holes of the inlet portion of the first core-support plate, and the second open end being fixed to one of the through-holes of the second core-support plate for forming sealed passages of the supercritical-pressure coolant from the inlet chamber to the intermediate header portion;

a second group of fuel tubes, each having third and fourth open ends, the third open end being fixed to one of the through-holes of the second core-support plate, and the fourth open end being fixed to one of the through-holes of the outlet portion of the first core-support plate for forming sealed passages of the supercritical-pressure coolant from the intermediate header portion to the outlet chamber, wherein the supercritical-pressure coolant and the sub-critical pressure coolant cannot be mixed together in the reactor vessel, and outer surfaces of the fuel tubes are exposed to the sub-critical pressure coolant;

a plurality of nuclear fuel assemblies disposed in the fuel tubes;

a feed water inlet disposed in the reactor vessel for introducing supercritical-pressure water into the inlet chamber;

a main steam outlet disposed in the reactor vessel for extracting supercritical-pressure steam out of the outlet chamber;

a coolant inlet disposed in the reactor vessel for introducing sub-critical pressure coolant into the shell portion outside of the fuel tubes;

a coolant outlet disposed in the reactor vessel for extracting sub-critical pressure coolant out of the shell portion outside of the fuel tubes;

a plurality of control rod guide tubes inserted into the shell portion outside of the fuel tubes;

a plurality of control rods which are arranged so that the control rods can be inserted into the control rod guide tubes; and a control rod drive for driving the control rods from outside of the reactor vessel.

8. A supercritical-pressure water cooled reactor comprising:

a reactor vessel including a shell part with an inlet-outlet header on an end;

a core-support plate with a plurality of through-holes fixed to the inlet-outlet header, so that an inlet-outlet header portion and a shell portion are formed in the reactor vessel;

a dividing plate for dividing the inlet-outlet header portion into inlet and outlet chambers so that the core-support plate is divided into inlet and outlet portions each having a fraction of the plurality of through-holes;

a plurality of curved fuel tubes, each having first and second open ends fixed to one of the through-holes of the inlet and outlet portions of the core-support plate, respectively, for forming sealed passages of the supercritical-pressure coolant from the inlet chamber to the outlet chamber via the fuel tubes, wherein the supercritical-pressure coolant and the sub-critical pressure coolant cannot be mixed together in the reactor vessel, and outer surfaces of the fuel tubes are exposed to the sub-critical pressure coolant;

a plurality of nuclear fuel assemblies disposed in the fuel tubes;

a feed water inlet disposed in the reactor vessel for introducing supercritical-pressure water into the inlet chamber;

a main steam outlet disposed in the reactor vessel for extracting supercritical-pressure steam out of the outlet chamber;

a coolant inlet disposed in the reactor vessel for introducing sub-critical pressure coolant into the shell portion outside of the fuel tubes;

a coolant outlet disposed in the reactor vessel for extracting sub-critical pressure coolant out of the shell portion outside of the fuel tubes;

a plurality of control rod guide tubes inserted into the shell portion outside of the fuel tubes;

a plurality of control rods which are arranged so that the control rods can be inserted into the control rod guide tubes; and a control rod drive for driving the control rods from outside of the reactor vessel.

9. An electric power generation plant having:

(a) a supercritical-pressure water cooled reactor comprising:

a reactor vessel including: first and second end parts for containing supercritical-pressure coolant and a shell part disposed between the first and the second end parts for containing sub-critical pressure coolant which is separated from the supercritical-pressure coolant in the reactor vessel;

first and second core-support plates each having a plurality of through-holes, the first and the second core-support plates being disposed in and fixed to the reactor vessel so that the core-support plates divide space inside the reactor vessel into first and second supercritical-pressure portions in the first and the second end parts, respectively, and a sub-critical pressure portion in the shell part;

a plurality of fuel tubes each having an inner volume, an outer surface, and first and second open ends fixed to one of the through-holes in the first core-support plate and one of the through-holes in the second core-support plate, respectively, so that the inner volumes of the fuel tubes are in fluidic communication with the supercritical-pressure portions, the outer surfaces of the fuel tubes can be exposed to the sub-critical pressure coolant, and the supercritical-pressure coolant and the sub-critical pressure coolant cannot be mixed together in the reactor vessel;

a plurality of nuclear fuel assemblies disposed in the fuel tubes;

a supercritical-pressure water inlet disposed in the reactor vessel for introducing supercritical-pressure water into one of the supercritical-pressure portions;

a supercritical-pressure steam outlet disposed in the reactor vessel for extracting supercritical-pressure steam generated in the fuel tubes out of one of the supercritical-pressure portions;

a sub-critical pressure coolant inlet disposed in the reactor vessel for introducing sub-critical pressure coolant into the sub-critical pressure portion;

a sub-critical pressure coolant outlet disposed in the reactor vessel for extracting sub-critical pressure coolant out of the sub-critical pressure portion;

a plurality of control rods which are arranged so that the control rods can be inserted into the sub-critical pressure portion adjacent to the fuel tubes through the shell part; and a control rod drive for driving the control rods from outside of the reactor vessel;

(b) a higher pressure turbine receiving the supercritical-pressure steam extracted from the supercritical-pressure portion of the reactor;

(c) means for extracting part of output steam of the higher pressure turbine to introduce the output steam to the sub-critical pressure portion of the reactor;

(d) a lower pressure turbine receiving the sub-critical pressure coolant extracted from the sub-critical pressure portion of the reactor; and (e) an electric generator driven by at least one of the higher and lower pressure turbines.

10. A supercritical-pressure water cooled reactor according to claim 8, wherein:

the reactor vessel is arranged so that an axis of the shell part lies substantially horizontally; and the control rod guide tubes are arranged substantially vertically.

* * * * *